United States Patent
Castiglia

[15] 3,695,480
[45] Oct. 3, 1972

[54] STREAMLINING MOTORCYCLE GAS TANK CLOSURE DEVICE

[72] Inventor: Anthony J. Castiglia, 412 Sherwood Drive, Streamwood, Ill. 60103

[22] Filed: Nov. 19, 1970

[21] Appl. No.: 91,071

[52] U.S. Cl. ............................................. 220/24 GT
[51] Int. Cl. ............................................. B65d 39/00
[58] Field of Search ............... 220/24 RC, 24 GT, 40

[56] References Cited

UNITED STATES PATENTS

| | | |
|---|---|---|
| 1,919,189 | 7/1933 | Andrie .................... 220/24 C |
| 1,915,633 | 6/1933 | Henst .................... 220/24 C |

Primary Examiner—George T. Hall
Attorney—Hill, Sherman, Meroni, Gross & Simpson

[57] ABSTRACT

Streamlining of gas tank closure caps is effected by a device which may be provided as an optional attachment, or which may be carried as a functionally integral inseparable part of the cap structure. Not only is the cap concealed, but an appearance is afforded of streamline integrity of design with the gas tank. Additionally, the device provides a protective shield as well as a convenient operating handle for the tank closure cap.

10 Claims, 5 Drawing Figures

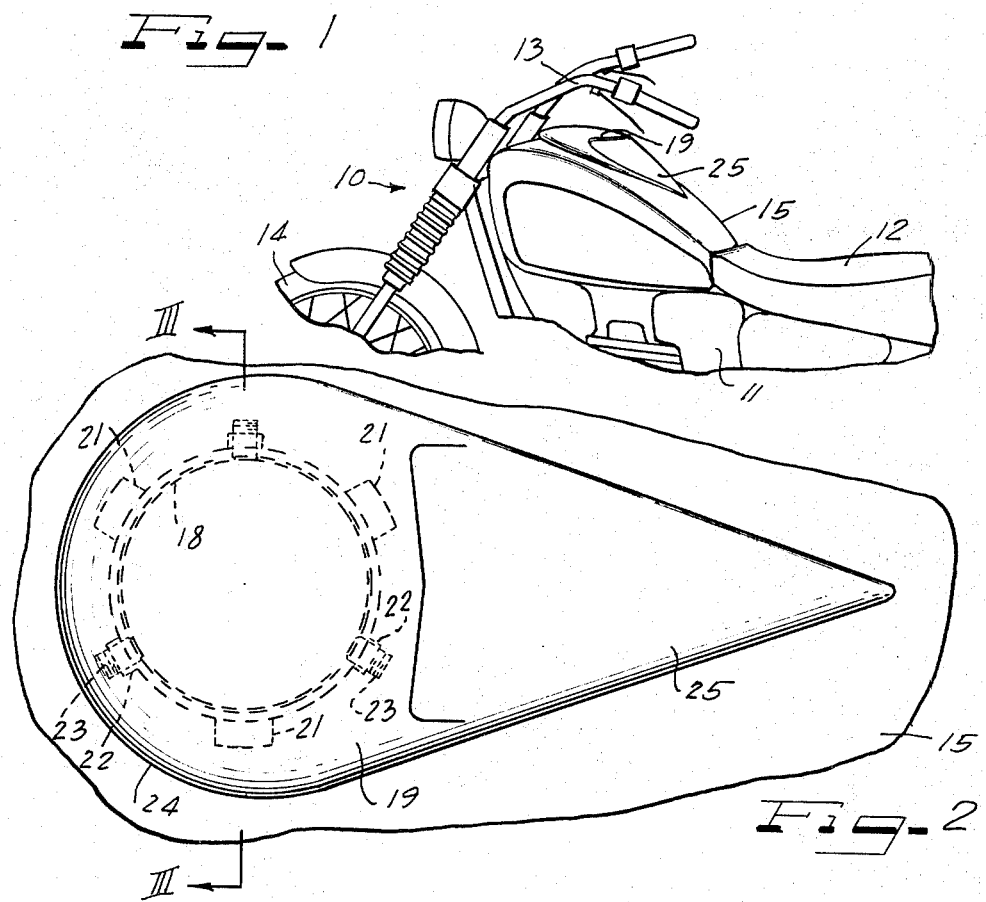
INVENTOR.
ANTHONY J. CASTIGILIA

STREAMLINING MOTORCYCLE GAS TANK CLOSURE DEVICE

This invention relates to motorcycle gas tank closure devices, and is more particularly concerned with the ornamental and protective streamlining of gas tank closure caps.

Motorcycle gas tanks are prominent features of and assume a fairly large proportion of the apparent structural features of motorcycles. Much attention has been devoted to attaining pleasing streamlined shapes for such tanks. By way of dress-up such tanks are also now widely decorated, often with special decorative contours and in addition thereto or alternatively provided with color ornamentation, generally enhancing the streamlined appearance of the tank. Nevertheless, the closure cap for the filler opening in the top of the tank has generally remained in the conventional cap form, most often chrome or nickle plated, projecting upwardly in an unprotected, relatively unsightly manner. Further, such caps are generally of the knurled rim circular type requiring firm direct manual gripping to be turned into or out of retaining engagement with the interlocking flange structure as customarily provided about the filling opening.

An important object of the present invention is to overcome the foregoing and other disadvantages, inefficiencies, shortcomings and problems in prior structures and to attain important advantages and improvements by providing a new and improved streamlining device for motorcycle gas tank closures.

Another object of the invention is to provide a novel gas tank closure streamlining device which is adapted to be mounted as optional equipment on a conventional gas tank cap.

A further object of the invention is to provide a new and improved motorcycle gas tank closure device in which the closure cap has functionally integral therewith a streamlining part.

Still another object of the invention is to provide a new and improved shield structure for a motorcycle gas tank closure cap.

A yet further object of the invention is to provide a new and improved combination motorcycle gas tank closure cap streamlining and handle device.

Other objects, features and advantages of the invention will be readily apparent from the following description of certain preferred embodiments thereof, taken in conjunction with the accompanying drawing, although variations and modifications may be effected without departing from the spirit and scope of the novel concepts embodied in the disclosure, and in which:

FIG. 1 is a fragmentary illustration of a typical motorcycle embodying features of the invention;

FIG. 2 is a top plan view of a device according to the present invention;

FIG. 3 is a sectional detail view taken substantially on the line III—III of FIG. 2;

FIG. 4 is a similar sectional view showing a modification; and

FIG. 5 is a similar sectional view showing another modification.

On reference to FIG. 1, a typical motorcycle 10 is depicted including a body frame 11 supporting at the rear a saddle 12 and having at the front handlebars 13 in steering control of a front wheel 14. Forwardly of the saddle 12 there is mounted on the frame 11 a gasoline supply tank 15 to be hereinafter referred to as the gas tank. This has the usual filling opening provided thereabout with a short neck 17 (FIG. 3) arranged to be closed by a closure cap 18 having a twist-on and off relationship to the neck.

As will be observed, the gas tank 15 is of a streamline form and the closure cap 18 projects sufficiently above the top surface of the tank to enable manipulation. In its original, unmodified relationship, the cap 18 is therefore exposed as a prominent upward projection out of harmony with the streamlined shape and contours of the tank itself. The cap 18 is also out of harmony with ornamentation which may be present on or applied to the outside of the tank by way of special or group dictated dress for the motorcycle.

According to the present invention, new and improved means are provided for, in effect, converting the cap 18 into an ornamental streamlining adjunct of the gas tank design, with also functional advantages as a concealing means for the cap and neck, as a protective shield for the cap and as a manipulating handle. In a desirable form, such means comprise a device 19 mounted on and carried by the cap 18.

In one desirable form, the device 19 is constructed and arranged to provide optional equipment, being provided with means for attaching it as an accessory to the cap 18. For this purpose, the device is desirably constructed as a metal stamping in the form of an inverted hollow metal shell body of elongated form having a front end portion of a width to receive the cap 18 therein with ample clearance about the rim of the cap to accommodate an attachment head 20 in the form of a ring of slightly larger inside diameter than and arranged to encompass the perimeter of the cap. In one desirable form, the attachment head ring 20 is provided with a plurality such as three attachment tabs 21 at equidistantly spaced positions thereon and which are secured by suitable means such as welding or brazing to the inside surface of the front end portion of the device 19. For securing the ring 20 fixedly to the cap 18, a plurality of internally threaded radial bosses 22 are provided on the ring, desirably in the areas of the ring between the attachment tab flanges 21, and in which bosses respective set screws 23 are threadedly engaged and tightened endwise against the perimeter of the cap 18. As will be observed in FIGS. 2 and 3, there is sufficient clearance within the downturned concealing margins of the device 19 to accommodate a plug wrench in sockets in the set screws where they are thus equipped, or to receive a claw wrench where the set screws are of the headed type. Through this arrangement, the device 19 is adapted to be securely fixedly attached to the cap 18 which from then on is adapted to be operated to twist it on into closing relation or to twist it off for opening the filling opening by manipulation of the device 19.

To provide a neat streamlining ornament carried by the cap 18, the device 19 is desirably of a generally arcuately crowned form in its front end portion wherein the cap 18 is received and concealed, with a downturned flange 24 of the device extending in arcuate plan about the front and opposite sides of the cap 18 and joining a rearwardly extending tail portion 25 which lies as closely as practicable to and is complementary to the contour of the upper rearwardly receding streamlined surface of the tank 15. In a desirable form, the tail portion 25 tapers rearwardly in plan and affords a generally tear drop shape to the device, considered in plan. Considered in another way from an ornamental viewpoint, the device 19 is shaped to afford a generally comet configuration with the front end portion simulating a comet head and the tail portion 25 a comet tail, emphasizing the streamline effect. In addition, of course, the tail 25 provides a convenient handle for manipulation of the gas cap 18.

Instead of attaching the device 19 to the cap 18 in the manner shown in FIGS. 2 and 3, the cap may be secured to the device directly as by means of screws 27 (FIG. 4). This manner of attachment is especially suitable where the device is constructed as a sand casting or die casting, although, if preferred, the attachment ring 20 may be cast integrally with the body of the device 19 if preferred where the body of the device is constructed as a molded or cast member.

If it is preferred to secure the device permanently to the cap, the arrangement of FIG. 5 may be employed where the body of the device is formed as a plastic or, if preferred, metal molded or cast part, with the cap 18 permanently engaged within the molded part, being provided, for example, with crisscross perimeter grooves or striations 28 to provide thorough anchorage for an encompassing embedment 29 within the device.

It will be apparent that the device 19 lends itself readily to numerous modes of assembly with the cap 18 to attain the important new and improved results and numerous advantages alluded to.

It will be understood that variations and modifications may be effected without departing from the spirit and scope of the novel concepts of this invention.

I claim as my invention:

1. A streamlining motorcycle gas tank closure device, comprising:
   a body providing an ornamental streamlining design adjunct for close cooperation with the top of a motorcycle gas tank so as to afford the appearance of streamlined integrity of design with the gas tank;
   said body being of downwardly opening hollow form receptive of an upwardly projecting gas tank filling opening neck and closure cap in concealed relation therein; and
   means within the hollow of said body to retain in assembly therewith the gas tank closure cap in concealed relation for engagement in removable closing association with the filling opening of said neck.

2. A device according to claim 1, in which said body has a front end portion and a tail end portion, said cap being retained in said front end portion, said retaining means including a structure providing a cap-receiving socket cavity, a down-turned flange formation in clearance relation about said cavity structure, and said tail end portion extending rearwardly from said flange formation over the associated tank and serving as a cap-operating handle.

3. A device according to claim 1, said body comprising an inverted hollow shell having a top wall and a down-turned perimeter flange formation, and said means retaining the cap with its crown against said top wall, said flange formation extending downwardly below a plane across the bottom edge of the cap.

4. A device according to claim 1, said retaining means comprising a ring adapted to encompass the cap and having means for removably securing the cap to the ring.

5. A device according to claim 4, said means for removably securing the cap comprising radial screws.

6. A device according to claim 1, in which said body is a casting, and said means to retain the cap comprising a cast formation within the hollow of the body, and including the cap functionally integrally attached to the body by said cast formation.

7. A device according to claim 1, including the cap in combination therewith, said body comprising a molded plastic structure, and said means to retain the cap permanently securing said cap to the body by perimeter embracement of the cap.

8. In combination with a motorcycle gas tank of streamlined form having an upwardly projecting top filling opening neck and a closure cap removably secured over the opening in said neck:
   a streamlined ornamental downwardly hollow member compatible in external shape as a design adjunct to the streamlined formation of said tank and with its perimeter in close cooperation with the top of the tank about and spaced from said neck so as to afford the appearance of streamlined integrity of design with the gas tank; and
   means securing said cap in fully concealed shielded relation within the hollow of said member and with said perimeter projecting downwardly beyond the bottom of said cap.

9. A combination according to claim 8, in which said member has a front portion including a structure providing a downwardly opening cap-receiving socket cavity within which the cap is engaged and a rear portion, said rear portion tapering toward a terminal end and being of a length and construction enabling its use as a handle for manipulating said cap into and out of closing relation to said filling opening.

10. A combination according to claim 8, said member having a generally comet shape in plan, with a front end portion within which the cap is secured and a rearwardly tapering tail portion, both of said portions relatively closely overlying the top of the tank so that the member appears as substantially a part of the tank design.

* * * * *